US008923159B2

(12) United States Patent
Bennett et al.

(10) Patent No.: US 8,923,159 B2
(45) Date of Patent: Dec. 30, 2014

(54) PROCESSING NETWORK TRAFFIC (75) Inventors: Mark Arwyn Bennett, Godalming (GB); Richard John Wilding, Teddington (GB); Gordon Campbell Friend, Hindhead (GB)

(73) Assignee: BAE SYSTEMS plc, London (GB)

( * ) Notice: Subject to any disclaimer, the term of this patent is extended or adjusted under 35 U.S.C. 154(b) by 209 days.

(21) Appl. No.: 13/512,491

(22) PCT Filed: Nov. 29, 2010

(86) PCT No.: PCT/GB2010/051979
§ 371 (c)(1),
(2), (4) Date: May 29, 2012

(87) PCT Pub. No.: WO2011/064597
PCT Pub. Date: Jun. 3, 2011

(65) Prior Publication Data
US 2012/0236756 A1    Sep. 20, 2012

(30) Foreign Application Priority Data

Nov. 30, 2009   (EP) ..................................... 09275115
Nov. 30, 2009   (GB) ..................................... 0920857

(51) Int. Cl.
*H04L 12/28*    (2006.01)
*H04L 29/06*    (2006.01)
*H04L 12/26*    (2006.01)

(52) U.S. Cl.
CPC ........ *H04L 63/0209* (2013.01); *H04L 63/1408* (2013.01); *H04L 43/026* (2013.01)
USPC ....................................................... 370/253

(58) Field of Classification Search
None
See application file for complete search history.

(56) References Cited

U.S. PATENT DOCUMENTS

2003/0074458 A1    4/2003  Gokhale
(Continued)

FOREIGN PATENT DOCUMENTS

GB       2407464 A      4/2005
WO    2005/101761 A1    10/2005

OTHER PUBLICATIONS

Notification Concerning Transmittal of International Preliminary Report on Patentability (Forms PCT/IB/326 and PCT/IB/373) and the Written Opinion of the International Searching Authority (Form PCT/ISA/237) issued on Jun. 14, 2012, in corresponding International Application No. PCT/GB2010/051979. (6 pages).
International Search Report (PCT/ISA/210) issued on Jan. 26, 2011, by the European Patent Office as the International Searching Authority for International Application No. PCT/GB2010/051979.

(Continued)

*Primary Examiner* — Anh-Vu Ly
*Assistant Examiner* — Gustavo Lopez-Vargas
(74) *Attorney, Agent, or Firm* — Scully, Scott, Murphy & Presser, PC (57) ABSTRACT A system adapted to process network traffic includes at least one processing engine configured to receive network data being transferred over a network and generate metadata relating to the data. The system includes at least one rule engine configured to receive and process the metadata to generate an output, and at least one selection engine configured to receive and process the rule engine output to determine whether the network data is to be processed by a further component and/or whether the network data is to continue to be transferred over the network. The processing engine, rule engine and selection engine can be implemented in system hardware or firmware, and the further component can be software for execution on another processor.

15 Claims, 5 Drawing Sheets

(56) References Cited

U.S. PATENT DOCUMENTS

| | | |
|---|---|---|
| 2003/0081627 A1* | 5/2003 | Bao et al. .................. 370/444 |
| 2005/0002352 A1* | 1/2005 | Bao et al. .................. 370/328 |
| 2005/0226235 A1 | 10/2005 | Kumar et al. |
| 2008/0201772 A1* | 8/2008 | Mondaeev et al. ............ 726/13 |
| 2009/0116397 A1* | 5/2009 | Denby et al. ................ 370/252 |
| 2009/0323529 A1* | 12/2009 | Horner ........................ 370/235 |
| 2011/0137733 A1* | 6/2011 | Baird et al. ................ 705/14.68 |

OTHER PUBLICATIONS

EP Search Report issued on Jul. 2, 2012 for European Application No. 09275115.5.

GB Search Report issued Feb. 24, 2012 for Great Britain Application No. 0920857.0.

* cited by examiner

PROCESSING NETWORK TRAFFIC

The present invention relates to processing network traffic.

It is desirable to monitor and process network traffic for many reasons, such as to detect malicious activity. One known system designed for this purpose is Detica's DCI-10 platform. This includes a hardware layer that provides hardware traffic inspection for examining every byte of every packet. Network packets that contain patterns of interest are passed to software for further processing. The software layer of the DCI-10 platform provides a flexible API (application programming interface) that enables a developer to dynamically indicate to the hardware layer which traffic is of interest and should therefore be passed to the software layer. Software modules produced by the developer are executed against the traffic via a software processing framework.

However, there is an increasing need to employ a more powerful set of analytics tools against network traffic. This is partly in response to the increased complexity of network threats meaning that malicious traffic must be identified based on behaviour rather than purely by technology or target identifiers. It is also partly due to the fact that developers have produced improved techniques and tools (e.g. to better identify anomalous traffic or suspicious hosts) but currently lack a means to deploy them at high traffic rates.

This class of analysis can be characterised by the requirement to track state, such as traffic events and statistics, across much, if not all, of the traffic. In many cases it is necessary to correlate such state not just in terms of a flow but also in consideration of peer communication, and potentially the network host to which each packet relates. Existing platforms lack native hardware support to provide stateful correlation of traffic and so it is necessary to have large numbers of packets processed by software to achieve this functionality. It is also necessary to have software examine the state that is correlated for each of these packets so that traffic of interest may be identified and processed by the software processing modules. These processing requirements, in addition to that of the actual software module, amounts to a high software processing load which is prohibitive at high speeds even with modern multi-core processors.

Embodiments of the present invention are intended to address at least some of the problems outlined above.

According to a first aspect of the present invention there is provided a system adapted to process network traffic, the system including:

at least one processing engine configured to receive network data being transferred over a network and generate metadata relating to the data;

at least one rule engine configured to receive and process the metadata to generate an output, and at least one selection engine configured to receive and process the rule engine output to determine whether the network data is to be processed by a further component and/or whether the network data is to continue to be transferred over the network.

The at least one selection engine, the at least one rule engine and the at least one selection engine will normally be implemented in system hardware or firmware. The further component will normally be implemented by software executing on another (remote) processor.

The at least one selection engine may be configured to combine the outputs of a plurality of the rule engines.

The metadata generated by the at least one processing engine may include data identifying a flow, peer communication, destination host and/or source host associated with the network data, e.g. by extraction from an IP header of the packet. Alternatively, another part of the network data may be used to generate the metadata, e.g. custom headers associated with the network data. The metadata may include data identifying at least one pattern and/or regular expression found in the network data. The metadata may include statistical data regarding the network data.

The processing engine may generate metadata indicating at least one category for the network data. The category may relate to a source (port and/or IP address) and/or a destination (port and/or IP address) of the network data. The category may specify whether the network data is associated with a particular flow, peer communication or a host. At least one said rule engine (and/or at least one said selection engine) may be configured to count, or monitor for, events relating to network data in a said category. The events may comprise a pattern match and/or a threshold comparison. The events may comprise events occurring within a flow, peer communication, or data relating to a particular host associated with the network data.

The system may include at least one memory component, which may store state data relating to the network data.

The system may include a delay path for delaying transfer of the network data whilst the network data is processed by the further component. The delay path may be used to retrieve selected network data previously transmitted, e.g. based on more recent events.

The processes executed by the at least one rule engine (and/or the selection and processing engines) may be configured by a developer to control, and/or interact with, functionality implemented in firmware components.

The network data may comprise an IP packet.

The firmware may comprise an FPGA onboard a processing blade.

According to another aspect of the present invention there is provided a method of processing network traffic, the method including:

using at least one processing engine to receive network data being transferred over a network and generate metadata relating to the data;

using at least one rule engine to receive and process the metadata to generate an output, and using at least one selection engine to receive and process the rule engine output to determine whether the network data is to be processed by a further component and/or whether the network data is to continue to be transferred over the network, wherein the at least one selection engine, the at least one rule engine and the at least one selection engine are implemented in system hardware or firmware, and the further component is implemented by software executing on another processor.

According to further aspects of the present invention there is provided computer program configured to execute at least some of the processes described herein.

Whilst the invention has been described above, it extends to any inventive combination of features set out above or in the following description. Although illustrative embodiments of the invention are described in detail herein with reference to the accompanying drawings, it is to be understood that the invention is not limited to these precise embodiments. As such, many modifications and variations will be apparent to practitioners skilled in the art.

Furthermore, it is contemplated that a particular feature described either individually or as part of an embodiment can be combined with other individually described features, or parts of other embodiments, even if the other features and embodiments make no mention of the particular feature. Thus, the invention extends to such specific combinations not already described.

The invention may be performed in various ways, and, by way of example only, embodiments thereof will now be described, reference being made to the accompanying drawings in which.

Figure 1:
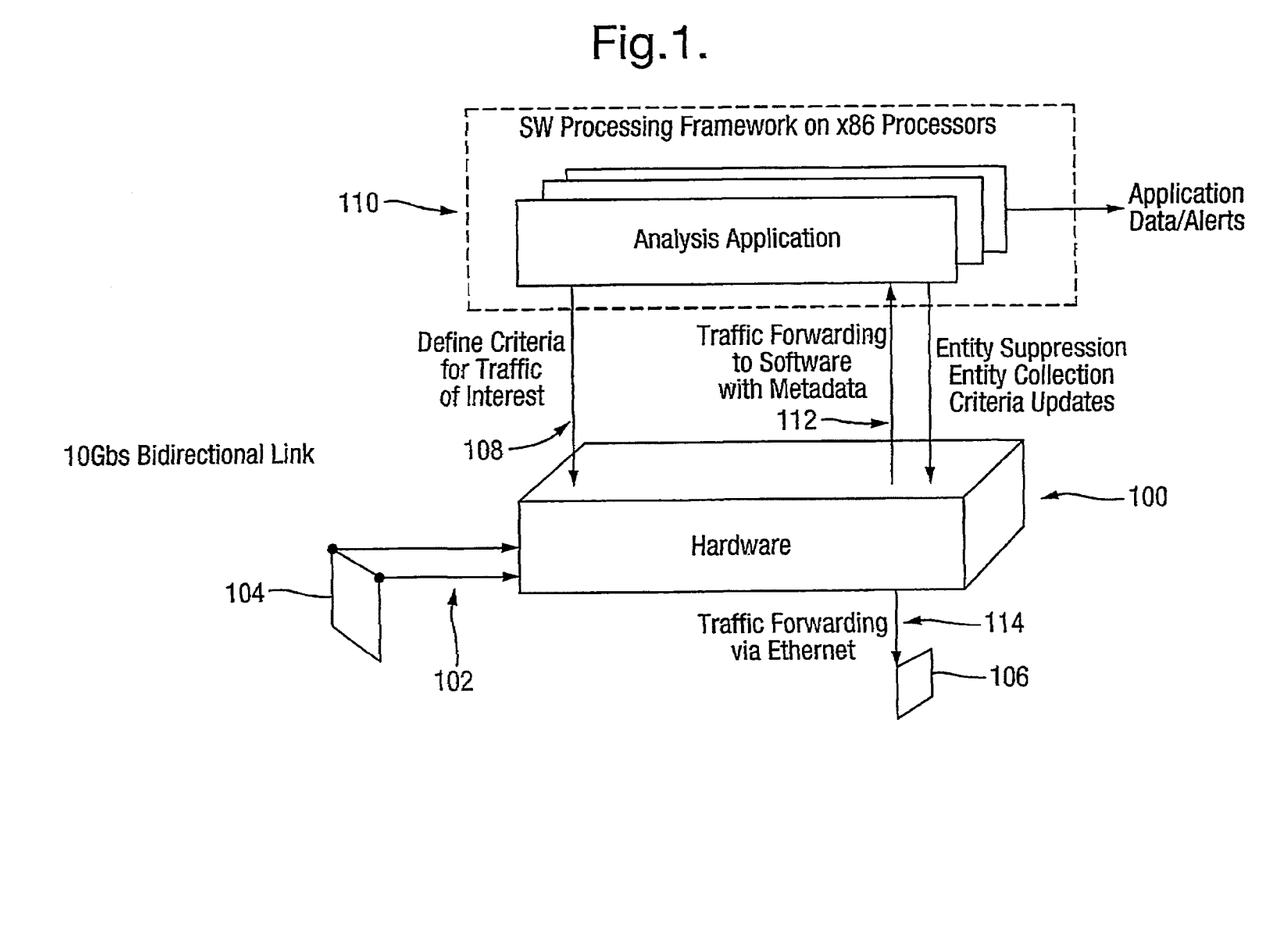
FIG. 1 is a schematic high-level block diagram of an embodiment of the processing system.

Referring to FIG. 1, an example of a system 100 adapted to process network traffic is shown. The system receives network traffic 102, e.g. IP packets transmitted over the internet from a source device 104 to a destination device 106. The system can be inline in a network, or may be deployed from a network "tap" that is configured to send the system a copy of all or some of the network traffic. The hardware includes firmware components that have been configured with criteria 108 created by a developer using an analysis application 110. The criteria define traffic that is of interest for further analysis. The system 100 applies the criteria to the incoming network data 102 and generates metadata 112 relating to the network data which is transferred to the analysis application 110. The application 110 can process the metadata and/or associated network traffic and, depending on the result of that processing may allow the network data to continue 114 to its original destination (if the system is inline in the network) and/or carry out another function, e.g. set an alert that suspicious activity has been detected.

It will be appreciated FIG. 1 is illustrative of an example only and variations are possible. For instance, an application separate to the analysis application 110 may be used to generate and edit the criteria 108, and the various components may be located on board physically distinct devices.

Figure 2:
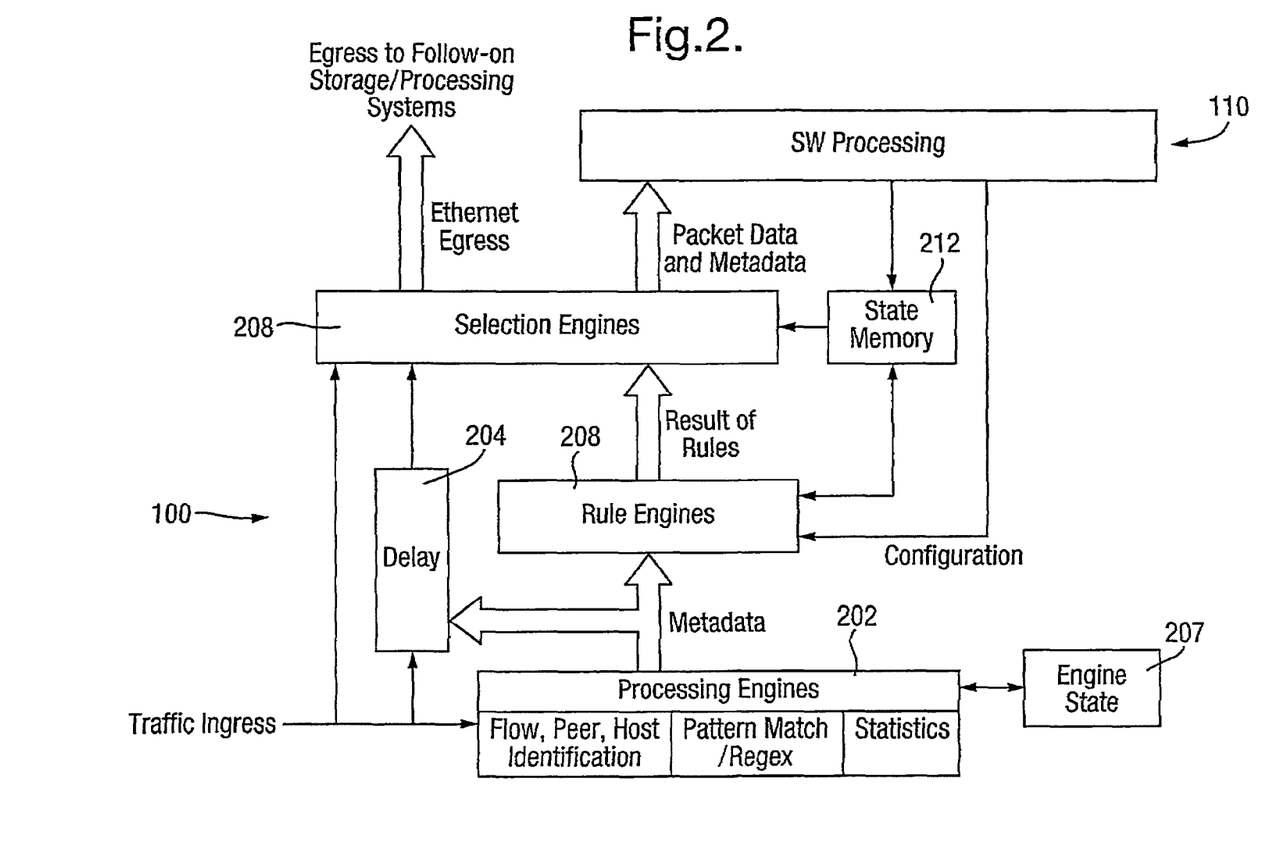
FIG. 2 is a more detailed schematic block diagram of the system.

FIG. 2 details functional blocks of the system 100. The first step in the logical flow of a packet through the system can be the packet being presented to at least one processing engine 202. It will be appreciated that other types of engines may also be included in alternative embodiments. Each of the processing engines generates metadata relating to the packet, which can include details of what, if any, patterns specified by the criteria 108 have been matched and/or statistics regarding the flow, peer and host with which the packet is associate. The packet and metadata can be buffered in a delay path 204. The metadata produced by the processing engines is presented to at least one rule engine 206, along with state data relating to the flow, peer and host membership of the packet. Each Rule Engine may be configured to perform simple operations such as a threshold comparison.

The results from the engines are then passed to at least one selection engine 208. The Selection Engine combines the results received from the Rule Engines to determine whether the current packet should be processed by software 110 and/or egressed for collection for follow-on storage/processing systems. One purpose of the delay path 204 is to allow the software application 110 time to process network data transferred to it. The delay path can also allow retrieval of packets that were previously transferred (within the capacity of the buffer) for further processing. Thus, the Selection Engine can also receive packets that are evicted from the delay path and, based on recovered control flags, determines if these packets should be processed in software 110 and/or egressed for collection. Packets are processed in software by the applications defined by the developer. The packets are presented together with the metadata generated for the particular packet and any application specific state data.

The system can track state records for statistics and traffic correlation, e.g. using engine state memory 207 and/or state memory 212. A new state entry is allocated when a packet arrives relating to a flow, peer or host that is not currently being tracked. State records are retired for reuse after a configurable period of inactivity or, in the case of a flow, when the system can identify that the flow has been terminated. Software is notified when a state record is retired. Software will also be notified if there are no state records available when a new one needs to be allocated for an incoming packet. The system can be configured to handle such an event by either dropping the packet or passing it directly to software (assuming sufficient bandwidth is available). The system may be direction agnostic when resolving the state record for a given flow, peer or host. This allows traffic events to and from a network entity to be correlated and acted upon.

In more detail, each of the processing engines 202 generates metadata regarding the packet being processed. The metadata can include an indication of a flow, peer and hosts associated with the packet. For stateful correlation of traffic statistics and traffic events, a number of membership categories can be computed for each packet. In the example four such categories are generated for each packet as follows:

As a packet in a flow as defined by the 5-tuple: source IP, destination IP, source port, destination port and protocol.

As a packet between two peers as defined by the 2-tuple : source IP, destination IP As a packet coming from a particular host as defined by the source IP address As a packet going to a particular host as defined by the destination IP address The above categories are generated based on (potentially masked) fields from the packet header. It is possible to configure these four categories with alternative field and masking criteria so that network packets may be correlated on other categories, such as class B or class C domain.

The processing engines can also perform pattern matching, regular expressions and packet header inspection functions. Each pattern match can be mapped to one or more pattern groups. The group information is presented to the rule engines allowing multiple patterns to process by each engine. The processing engine is also presented with fields from the packet header allowing matches against particular traffic ports, IP addresses and other relevant header fields. Regular expressions are supported by means of the combination of pattern match groups and the Boolean selection capability of the Rule Engines. A regular expression can often be translated into several selectors which are typically too weak to be the sole basis of packet selection. A stronger selection criterion can be realised by using the Rule Engines to combine these weak selectors together. The full regular expression can then be validated by software 110.

The processing engines can also update state and generate metadata fields for each of the packet categories (flow, peer and host). Examples of metadata statistics include the timestamp of the packet, byte and packet counts, packet and data rates and duration. Specific examples are given in the table below:

| Category | Field | Description |
| --- | --- | --- |
| Packet | Timestamp | Timestamp applied to the packet at ingress to the board |

-continued

| Category | Field | Description |
|---|---|---|
| Entity (Flow, peer or Host) | Byte count (in) | Number of bytes seen to the entity |
| | Byte count (out) | Number of bytes seen from the entity |
| | Packet count (in) | Number of packets seen to the entity |
| | Packet count (out) | Number of packets seen from the entity |
| | Byte count (in) (as observed over the past minute) | To the entity |
| | Byte count out) (as observed over the past minute) | From the entity |
| | Packet count (in) (as observed over the past minute) | To the entity |
| | Packet count (out) (as observed over the past minute) | From the entity |
| | Duration | The time that the entity has been tracked for (not applicable to flows). |
| | Time since last packet (in) | To the entity |
| | Time since last packet (out) | From the entity |
| | Flow count | Number of flows observed for this entity |

Statistics can be maintained with consideration to directionality. For example, when tracking a particular flow, packets from A to B will update the same state data as packets from B to A, but with the former updating the In counters and the latter updating Out counters (or vice-versa). The statistics fields can be generated in a compressed format to ensure that the resultant system bandwidth is achievable. The system can permit easy transformation to a standard number representation.

Figure 3:
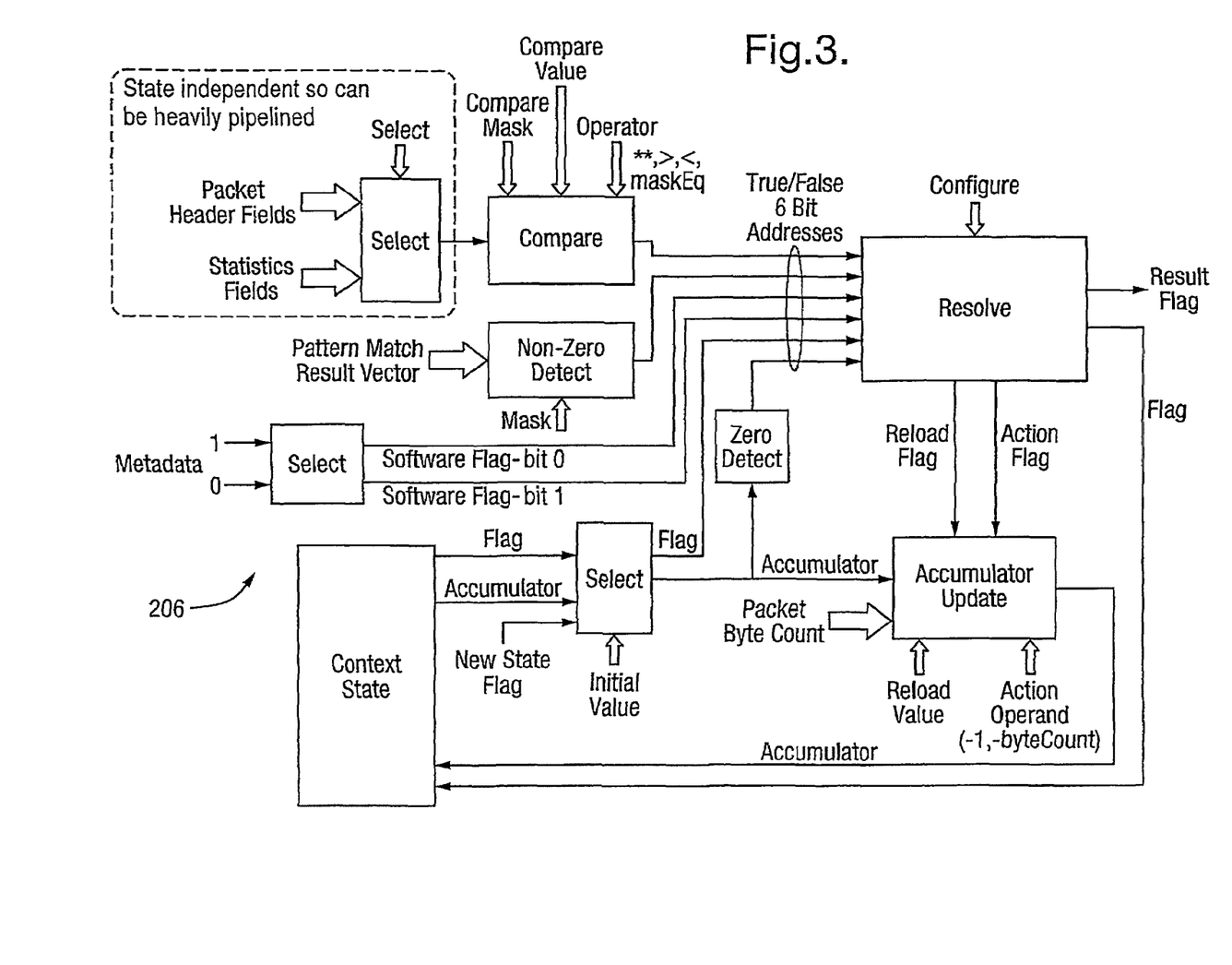
FIG. 3 is a block diagram of a Rule Engine of the system.

The Rule Engines 204 are configured by the framework in response to API calls invoked by the developer. FIG. 3 is an overview of an example Rule Engine configured to take input from the packet header fields or the statistics metadata. It will be appreciated that the components shown are merely one example of how the Rule Engine functionality described herein can be implemented.

The Rule Engine can perform greater than, less than and equivalence integer operations against a threshold, with a specified bitwise mask. The Rule Engine can also receive input from pattern match group information and perform an equivalence check of this data with a specified bitwise mask. Each Rule Engine can be associated with a dedicated per-flow, peer or host state memory which can be loaded with a configured value and updated by the engine. This state can be used to count flow, peer or host events (such as pattern matches, packets or bytes). Additionally, each Rule Engine can have a per-flow, peer of host flag which may be controlled by the software 110.

The result of the numerical comparison, the pattern match check, the state memory and the software-controlled flag can be fed into a lookup table that is configured at a per-engine level to specify how the state memory should be updated and what Boolean result should be expressed for the Rule Engine. The flexibility of this approach allows for variety of functionalities to be realised. Examples include:

To generate a positive result whenever a pattern is matched;
To generate a positive result whenever a pattern is matched, and for the subsequent n packets in a flow, peer or host;
To output a positive result until a pattern is matched. A negative result is then output for all subsequent packets in the flow, peer or host.
To output a positive result after n occurrences of a particular pattern have matched for a flow, peer or host.

Rather than considering a pattern match, the examples above could be based on the evaluation of a metadata field, such as the packet count compared to a predefined threshold. The lookup table can also be presented with a bit field that is under software control. This allows software to influence each Rule Engine for a given flow, peer or host; for example, to reset the Rule Engine counter, or to disable a particular Rule Engine.

The Selection Engine(s) 208 combine the results of multiple Rule Engines to determine if a particular packet and associated metadata should be forwarded to the software 110 and/or egressed to the Ethernet port for collection by down stream systems. The control of how the results from different Rule Engines are combined is configured by the software 110. This further extends the functionality that is provided by the hardware, for example selection of packets occurring on a specific TCP port that also contain a pattern match, or selection of flows which exceed a specified data rate and don't contain a specified set of patterns. Additionally, the Selection Engine can be presented with packets that emerge from the delay path 204. The selection flags for these packets are recovered from state memory 212 and are examined to determine what, if any, forward processing should be performed for the recovered packet.

The software 110 is used to configure the system hardware Engines by means of an API in the example system. The API can take several forms, but in the embodiment described herein it is based on the C++ programming language, which advantageously allows standard software engineering practice to be used. The API allows code produced by the developer to work with the system hardware. The compiled code runs on the software blade and makes low level calls to the hardware in order to configure the Rule Engines and the other components. Thus, system components including the processing engine(s) 202, the rule engine(s) 206 and the selection engine(s) 208 are implemented by means of configurable hardware/firmware onboard the system 100, whilst the software application 110 is executed by an off-board processor. The system framework provides hardware acceleration of key functions and the lightweight API can be employed to offload traffic processing criteria to hardware. This allows a higher level of performance to be achieved for a given amount of software processing resource. It is anticipated that several software modules will be running concurrently on the platform during operation. Each module can perform a number of activities as follows, for example:

Initialization
    Registration of static packet processing/collect criteria via the API
    Allocation and initialisation of application state
    Other application specific initialization tasks
Packet processing, including the follow sub-tasks:
    General application-specific logic
    Access to packet metadata (including statistics, other hardware acceleration results, and flow, peer and host state)—via the API
    Suppression of passing of unwanted data (for a flow, peer or host) to software—via the API
    Dynamic registration/deregistration of packet processing/collect criteria—via the API A developer can use relevant standard C++ techniques and practices for the particular task in hand. Typically, a processing flow examines elements of the metadata, the state record and the packet content in order to determine what further processing tasks should be performed on the traffic. The developer can make API calls to offload elements of this examination step to the hardware so that overall system performance is improved.

The skilled person will be capable of designing and implementing a suitable API including necessary initialisation and processing methods that will be called by the processing framework.

Software processing of packets can be performed on multiple processing blades, with each blade providing multiple processing cores. When several packets for a particular flow, peer or host are being processed in parallel there is a race condition in regards to the integrity of the state data associated with the flow, peer and host that the packets are a member of. These issues can be addressed in a number of ways with varying complexity and yielding a range of efficiency/processor utilisation. In one embodiment a basic load balancing scheme is proposed. The system hardware will support load balancing at a per IP address or per state level, and duplication of packet payload and metadata (when state-based load balancing results in a packet being routed to multiple processors).

An implication of this approach is that processing of a particular flow, peer of host will be tied to a specific processor or processor blade. The suitability of this scheme will therefore vary significantly depending on the traffic characteristics of a particular link and the applications that are deployed. The skilled person will appreciate that it may be possible to implement more efficient load balancing (or packet distribution) schemes, but this can require additional hardware resource and more sophisticated software management.

Figure 4:
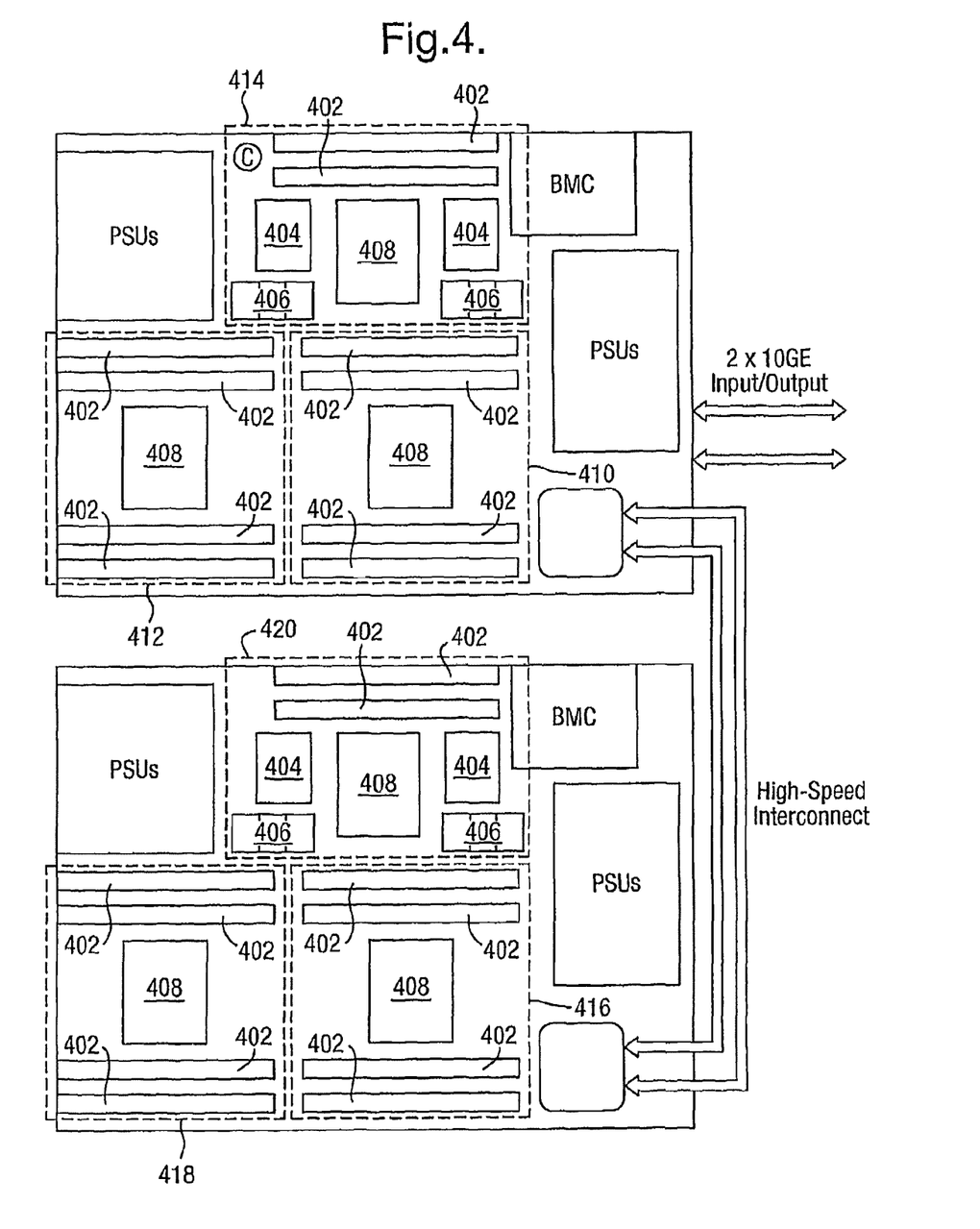
FIG. 4 is a block diagram of a hardware implementation of the system.

FIG. 4 illustrates an example implementation of the system 100 based on an IBM BladeCenter H platform. 10 Gbps duplex capability can be achieved in a 2 blade solution with each blade consisting of identical hardware but running different firmware. The BladeCenter offers high capacity power and cooling, 44 Gbit/s of network connectivity per slot, as well as a wide range of high-performance processing blades, for the software components to run on. A 10G duplex capability embodiment of the system can be constructed in a 2 blade solution, with each blade hardware identical, but running different firmware.

In the example blade design and functional allocation of FIG. 4, blocks labelled 402 comprise DIMM; 404 comprise CAM; 406 comprise SRAM and 408 comprise FPGA. Components in outline 410 comprise the ingress/protocol finder; 412 comprise the delay buffer; 414 comprise the IPQ lookup; 416 comprise the statistics block; 418 comprise the Rule Engines and 420 comprise the pattern search/Rule Engines. The functions performed by these items will be described below in more detail (with reference to the data flow of FIG. 6).

The flow, peer and host contexts will need to be identified for each packet.

It is necessary to consider two host contexts for each packet: one relating to the source IP address and one relating to the destination IP address. Given the high packet rates that must be catered for, it may be unfeasible to regard the two host memberships as part of the same category (because this would require two accesses from the same category memory). However, in a live network it is generally reasonable to assume that the routing algorithms are efficient, therefore a source IP address in one direction (A->B) should only be seen as a destination IP address in the reverse direction (B->A). This allows the hosts category to be broken into two, hosts at link end A and hosts at link end B. By making this assumption there are now four categories: flows, peers, hosts(A) and hosts(B), each of which can be handled separately by the hardware. The mapping of application "Host" based rules to these two categories will be handled by the software API.

Figure 5:
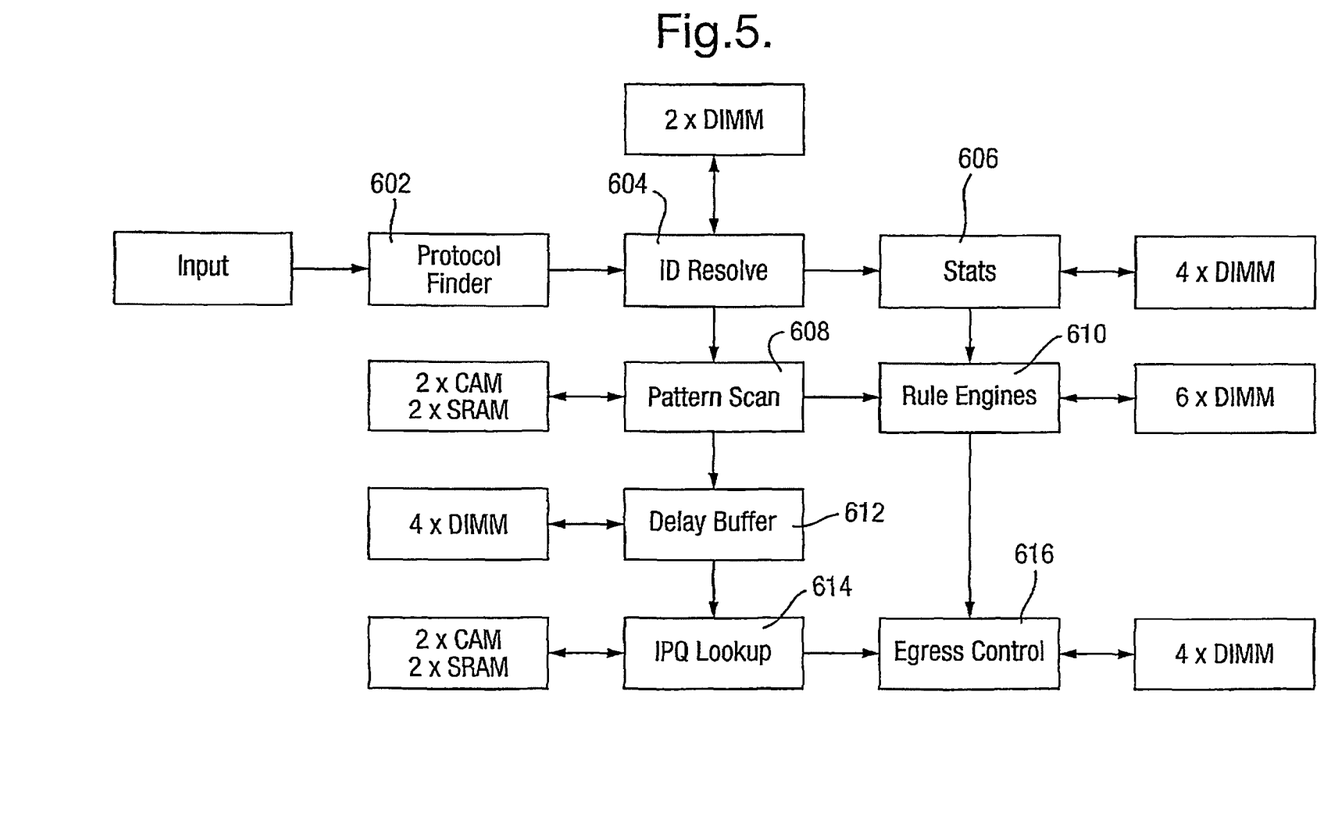
FIG. 5 shows flow of data through functional blocks in an example system.

As part of the hardware/firmware design, each entity (a flow, peer or host) can be handled equally. This allows significant reuse of both hardware and firmware elements and to help avoid confusion in relation to this a set of terms is defined here:

Category—a type of characteristic, e.g. flows, hosts and peers are each a different category Context—For each individual entity in a particular category, there exists a context, within which all processing relating to that entity is performed. Each context is assigned a unique ID within its category when it is first encountered State—For each context a set of information describing that context's current state is stored in memory FIG. 5 shows the flow of data through the functional blocks on an example board implementation of the system, with main resource allocation assignments against each. The Protocol Finder 602 can be implemented in an FPGA and identifies the standard 5-tuple packet fields discussed above, as well as populating metadata with packet length. The Finder splits the packet up, with the meta-data, including the extracted 5-tuple, going into a Statistics block 606, while the full packet is sent into a delay buffer 612 and a pattern scanner 608. This separation alleviates a number of the dataflow bottlenecks and simplifies some of the logic.

In order to maintain statistics across the different categories of traffic, each packet can be associated with 4 states. Each state can be either a pre-existing state where the context has already been "seen" or a new state where this is the first appearance of the context. For instance, a TCP/IP packet will be associated with a flow state, 2 host states and a peer state.

On arrival at the statistics block 606 the packet will have all 4 of its state IDs, along with metadata attached. Each of the 4 categories of state will be handled separately, as they are mutually exclusive. Two activities are performed in the statistics block: state maintenance and statistics production. The state maintenance involves a READ-MODIFY-WRITE cycle on the state memory, while the statistics production requires transforms to be performed to ready the values for inspection. State held for tracking and generating statistics are based on fixed time slicing using simple addition and comparison. This allows the state maintenance to be achieved in a few clock cycles.

A number of different options were considered for achieving the pattern scan functionality performed by block 608. One example mechanism uses a pair of Ternary CAMs in conjunction with SRAMs to perform a lookup.

Once the statistics have been calculated and the packet has been searched for any target patterns, the results along with the packet metadata are presented to the rule engines 610. In the example there are 4 banks of rule engines, one for each of the categories identified above. Each bank of engines has context state held in an associated memory, and may use a caching scheme to guarantee coherency.

The delay buffer 612 serves three main purposes. The first is as an intermediate store of the packets as they arrive to allow the statistics, pattern scanning and finally rule engines to decide whether a packet should be passed to software. The second purpose is to reduce system bandwidths by not requiring packet data to be moved around the processing elements any more than necessary. As such only the metadata, statistics and decisions need to be sent back from the rule engines.

Thirdly, the delay buffer allows a certain amount of time for the software applications to decide whether or not a flow is wanted.

The delay buffer can be implemented using multiple memories, allowing independent delay paths to be created. These can be connected up in any suitable manner, e.g. paired, with the first pair providing a relatively short delay to allow for hardware and firmware processing latencies. The second pair can be used to provide a longer delay to enable longer term software latencies to be accommodated.

The IPQ lookup block 614 is made available at the end of the delay buffer 512 to allow particular IP tuples to be extracted, either as part of simple rules, or in response to some software based decision.

The egress control block 616 provides buffering and load balancing across the software processing blades. The data that is egressed can consist of the following:
  Packet payload
  Computed statistics
  Pattern matches (including positions)
  Result vector indicating which rule engines 'fired'
A number of example workflows that illustrate use of the system are given in the table below;

| Capability | Description | Support provided by hardware |
|---|---|---|
| Traffic selection based on flow, peer and host statistics | The developer can request a flow, peer or host when one of the computed statistics for it meets a specified criteria. For example, host traffic could be collected when the number of flows connected to the host exceeds a statically defined threshold. A further example is the collection of a flow when the data rate drops below a certain value. | API calls are mapped to hardware rule engines. A rule engine can be configured to compare fields from metadata against per flow, peer and host state thresholds. The output of a rule engine specifies that the packets for the particular network entity (flow, peer or host) are to be processed in software and/or egressed for collection by a downstream system. |
| Stateful correlation of events | Persistent state data tracks when certain traffic events occur (ie pattern matches or a statistic field exceeding a specified threshold). This state record can be updated over multiple packets for a particular flow, peer or host. Both directions of a flow, peer or host communication are resolved to the same state data. | The hardware maintains state for each of the flows, peers and hosts being tracked. Software can update certain aspects of this state to control software processing of particular network entities. Boolean logic allows for multiple statistics fields and traffic events to be combined. |
| Negative selection | For simple criteria the hardware can deselect traffic without software intervention. For more complex criteria (which requires software to determine if a flow, peer or host should be deselected) the API provides a mechanism to instruct the hardware to suppress passing of further packets to software. | Combinatorial logic allows the results from several rule engines be combined in a manner that effectively disables all rules for a particular network entity and application. |
| Sampling of traffic from a network entity | The API provides simple calls to enable sampling of packets from a flow, peer or host. Sampling can be controlled for a given number of packets from a network event. For example the first n packets of a flow or the next m bytes of traffic to a host after a specific pattern is identified in the traffic. | The hardware tracks statistics for each flow, peer and host. A rule engine can be configured to fire based on the value of the byte or packet count in these statistic records. |

The embodiments of the system described above can reduce the amount of software processing that must be performed for each packet. Common and expensive analysis tasks are offloaded into dedicated hardware, thereby reducing the number of packets that must be processed by software to achieve the required functionality. The developer can employ hardware rules to identify flow, peers and hosts of interest based on the related state. Software processing of packets for an uninteresting flow, peer or host can be suppressed indefinitely or until a notable event occurs. Further, packet content and traffic statistics can be relayed to software periodically (i.e. sampling). The statistics can be computed from all packets, but the software needs only read these results periodically. Efficiently distributing packets amongst the available software processing resources means that they only receive the data they actually require.

The embodiments can deploy existing analysis techniques on live network traffic at high speed. Additionally, they provide an environment for rapid development of new applications and analyses. The API allows the development of traffic processing software modules in C++, for example, using standard software engineering practices and tools. The software modules can be deployed cost effectively and efficiently using COTS processors by means of hardware acceleration of common and expensive analysis tasks (including support for stateful flow-based processing). The sophisticated selection of packets can reduce the volume of traffic that must be processed by software to achieve a particular design goal, and efficiently distributing packets to multiple software processing cores across multiple processing blades (or cards) also improves efficiency.

The invention is claimed is:

1. An apparatus for processing data being carried over a network, the apparatus comprising:
   an input for receiving data from the network;
   a first processing engine with access to the input to determine a source and a destination for received data and to associate the received data with at least one of a flow, a peer and a host communication;
   a second processing engine with access to the input for performing a comparison of received data with one or more predetermined patterns;
   wherein said first and second processing engines are arranged to update state data relating to the associated flow, peer or host communication and, further, to generate metadata in respect of the received data, the metadata comprising results of processing the received data by one or both of the first and second processing engines;
   the apparatus further comprising at least one rule engine configured to receive and process the metadata and the updated state data of the associated flow, peer or host communication and to generate an output; and
   at least one selection engine configured to receive and process the rule engine output to determine whether received data relating to a flow, peer or host communication are to be processed further, wherein the first and second processing engines, the at least one rule engine and the at least one selection engine are implemented in system hardware or firmware.

2. The apparatus according to claim 1, wherein the at least one selection engine is configured to combine outputs of a plurality of the rule engines.

3. The apparatus according to claim 1, further comprising a third processing engine for generating statistical information relating to the received data relating to the respective flow, peer or host communication and to make corresponding updates to the respective state data.

4. The apparatus according to claim 3, wherein the statistical information comprises data characterizing a flow, a peer or a host communication, including at least one of: data indicative of the time of receipt of respective data from the network; data indicative of the volume of respective received data; and data indicative of certain predetermined patterns having been detected in respective received data; and where the state data relates to a peer or a host communication, an indication of the number of flows observed for the respective peer or host communication.

5. An apparatus according to claim 1, wherein the received data comprise an IP packet being carried over an IP packet network and wherein the first processing engine is arranged to determine the associated flow (source and destination IP address, source and designation port, protocol) the peer (source and destination IP address combination) and host (source host IP address, destination host IP address) communication from the content of the received IP data packet.

6. The apparatus according to claim 5, wherein at least one of said rule engine and said selection engine is configured to count, or monitor for, events relating to the received network data for a particular flow, peer or host communication.

7. The apparatus according to claim 6, wherein the events comprise at least one of a pattern match and a threshold comparison.

8. The apparatus according to claim 7, comprising:
at least one memory component configured to store the updated state data relating to each flow, peer or host communication.

9. The apparatus according to claim 1, further including:
a delay path for delaying transfer of the received network data to allow for further processing by a further component or to enable subsequent retrieval of received data while it remains within the delay path.

10. The apparatus according to claim 1, wherein the system hardware or firmware comprises:
an FPGA on-board a processing blade.

11. A method of processing data being carried over a network, the method comprising the steps of:
i) receiving data from the network;
ii) determining a source and a destination for the received data and associating the received data with at least one of a flow, a peer and a host communication;
iii) performing a comparison of received data with one or more predetermined patterns;
iv. updating state data relating to the associated flow, peer or host communication;
v) generating metadata in respect of the received data, the metadata comprising results of processing the received data at step ii) and step iii),
vi) applying at least one rule to process the metadata and the updated state data of the associated flow, peer or host communication and to generate an output, and
vii) determining, from the output at step vi), whether received data relating to the associated flow, peer or host communication are to be processed further.

12. The method according to claim 11, wherein the determining step vii) is arranged to combine the outputs from step vi) of a plurality of rules.

13. The method according to claim 12, further comprising the step of:
viii) generating statistical information relating to the received data and to the respective flow, peer or host communication and updating the respective state data.

14. The method according to claim 13, wherein the statistical information comprises data characterizing a flow, a peer or a host communication, including at least one of: data indicative of the timing of receipt of respective received data from the network; data indicative of the volume of respective received data; and data indicative of certain predetermined patterns having been detected in respective received data; and, where the state data relates to a peer or a host communication, an indication of the number of flows observed for the respective peer or host communication.

15. The method according to claim 11, wherein at least one of said at least one rule at step vi) and the determining step vii) is arranged to count, or monitor for events relating to the received network data for a particular flow, peer or host communication.

* * * * *